(12) United States Patent
Willson

(10) Patent No.: US 11,372,881 B2
(45) Date of Patent: Jun. 28, 2022

(54) TIME SERIES DATABASE

(71) Applicant: The Boeing Company, Chicago, IL (US)

(72) Inventor: Ian Alexander Willson, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 166 days.

(21) Appl. No.: 16/453,907

(22) Filed: Jun. 26, 2019

(65) Prior Publication Data

US 2020/0409966 A1 Dec. 31, 2020

(51) Int. Cl.
*G06F 16/25* (2019.01)
*G05D 1/00* (2006.01)
*G06F 16/2458* (2019.01)
*G06F 16/29* (2019.01)

(52) U.S. Cl.
CPC ......... *G06F 16/254* (2019.01); *G05D 1/0088* (2013.01); *G06F 16/2477* (2019.01); *G06F 16/29* (2019.01)

(58) Field of Classification Search
CPC .... G06F 11/3452; G06F 21/31; G06F 16/254; G06F 16/2477; G06F 16/29; G05D 1/0088
See application file for complete search history.

(56) References Cited

U.S. PATENT DOCUMENTS

| | | | |
|---|---|---|---|
| 8,271,430 B2 | 9/2012 | Willson | |
| 8,688,622 B2 | 4/2014 | Willson | |
| 10,417,251 B2 | 9/2019 | Willson et al. | |
| 2007/0266782 A1* | 11/2007 | Bartz | G06Q 10/087 73/156 |
| 2015/0112883 A1* | 4/2015 | Orduna | G06Q 50/265 705/325 |
| 2016/0125083 A1* | 5/2016 | Dou | G06F 16/951 707/709 |
| 2016/0162543 A1* | 6/2016 | Gustafson | G06F 16/24534 707/769 |
| 2017/0018125 A1* | 1/2017 | Jover | G07C 5/0841 |
| 2018/0134372 A1* | 5/2018 | Kanistras | B64C 39/024 |

(Continued)

OTHER PUBLICATIONS

Willson, Ian Alexander, "Preconditioning Time-Series Data for Improved Efficiency," U.S. Appl. No. 17/648,334, filed Jan. 19, 2022, 30 pages.

(Continued)

*Primary Examiner* — Albert M Phillips, III
*Assistant Examiner* — Courtney Harmon
(74) *Attorney, Agent, or Firm* — Alleman Hall Creasman & Tuttle LLP (57) ABSTRACT

A computing system includes a database server configured to receive data including a plurality of elements each including a sensor identifier and time element, each time element including a timestamp or time period, and create a time series of the data indexed by the sensor identifiers into buckets spaced at even time intervals. The database server is configured to receive a query including at least one of the sensor identifiers and at least one query time element. The database server is configured to locate target data in the buckets by the at least one of the sensor identifiers and the at least one query time element and output the target data.

20 Claims, 6 Drawing Sheets

(56) References Cited

U.S. PATENT DOCUMENTS

2018/0307727 A1* 10/2018 Lucas ............... G06F 16/24553
2020/0278660 A1* 9/2020 Virk ................ G05B 19/41895

OTHER PUBLICATIONS

Willson, I., "IoT @ Boeing: From Flight Data Recorders to Factory RFID Analytics," Proceedings of XLDB 2018, May 1, 2018, Stanford University, 10 pages.
Willson, I., "Real-time Data Fusion at Scale for Aircraft Manufacturing," Proceedings of EE392b: Industrial AI, Apr. 30, 2019, Stanford University, 1 page.

* cited by examiner

FIG. 1

|  | 28 | 32 | 30 |
|---|---|---|---|
|  | Sensor ID | Location (e.g., lat./long.) | Timestamp |
| Location 1 | 000000A0 | 47.9061N, 122.2814W | 2019-05-29 13:41:23 |
|  | 000000A0 | 47.9061N, 122.2814W | 2019-05-29 13:41:24 |
|  | 000000A0 | 47.9061N, 122.2814W | 2019-05-29 13:41:25 |
|  | 000000A0 | 47.9061N, 122.2814W | 2019-05-29 13:41:26 |
|  | 000000A0 | 47.9061N, 122.2814W | 2019-05-29 13:41:27 |
| Location 2 | 000000A0 | 47.9062N, 122.2815W | 2019-05-29 13:41:28 |
|  | 000000A0 | 47.9062N, 122.2815W | 2019-05-29 13:41:29 |
|  | 000000A0 | 47.9062N, 122.2815W | 2019-05-29 13:41:30 |
|  | 000000A0 | 47.9062N, 122.2815W | 2019-05-29 13:41:31 |
|  | 000000A0 | 47.9062N, 122.2815W | 2019-05-29 13:41:32 |
| Location 3 | 000000A0 | 47.9064N, 122.2816W | 2019-05-29 13:41:33 |
| Location 4 | 000000A0 | 47.9065N, 122.2816W | 2019-05-29 13:41:34 |
| Location 5 | 000000A0 | 47.9066N, 122.2816W | 2019-05-29 13:41:35 |
|  | 000000A0 | 47.9066N, 122.2816W | ... |

FIG. 2

| Sensor ID (28) | Location (e.g., lat./long.) (32) | Time Period (30) | Duration (36) |
|---|---|---|---|
| 000000A0 | 47.9061N, 122.2814W | [2019-05-29 13:41:23, 2019-05-29 13:41:28] | 5 |
| 000000A0 | 47.9062N, 122.2815W | [2019-05-29 13:41:28, 2019-05-29 13:41:33] | 5 |
| 000000A0 | 47.9064N, 122.2816W | [2019-05-29 13:41:33, 2019-05-29 13:41:34] | 1 |
| 000000A0 | 47.9065N, 122.2816W | [2019-05-29 13:41:34, 2019-05-29 13:41:35] | 1 |
| 000000A0 | 47.9066N, 122.2816W | [2019-05-29 13:41:35, 2019-05-30 13:41:23] | 86,388 |

FIG. 3

| Sensor ID (28) | Geo Zone (32) | Time Period (30) | Duration (36) |
|---|---|---|---|
| 000000A0 | Building 1, Room A | [2019-05-29 13:41:23, 2019-05-29 13:41:33] | 10 |
| 000000A0 | Building 2, Room B | [2019-05-29 13:41:33, 2019-05-30 13:41:23] | 86,390 |

TIME SERIES DATABASE

FIELD

This invention relates generally to database management and analytics, and more specifically, to cost-effective temporal analytics in parallel time series databases.

BACKGROUND

Performing analytics on data can be done in mini-batch loads. However, for real-time data such as sensor data, waiting for the data to be processed in each mini-batch can cause too much latency to be practical, particularly as the amount of data being processed increases. Temporal and geo-spatial extract, transform, load (ETL) processing of sensor data, for example, can introduce excessive latency when the sensor data is time sensitive, and retrieval of the processed data can become costly in terms of processing resources as the amount of data increases. For example, the American National Standards Institute (ANSI) provides a structured query language (SQL) query that allows for alignment of time-based (e.g., temporal) data using the OVERLAPS predicate. The OVERLAPS predicate can be used in combination with a normalization operation to perform temporal normalization in which redundant data over time is condensed. Such a query is a processor-intensive operation that adds substantial latency and thus is not feasible for use on real-time or time-sensitive data. Furthermore, large amounts of data are retained as a result, and therefore storing a continuous stream of data after using this function requires increased storage space.

On the other hand, parallel time series databases, which are optimized for time-stamped data, typically have relatively low data retrieval costs. However, such databases have not thus far been compatible with temporal normalization, due to the required storage space and retrieval cost multiplying. Accordingly, a need exists for a way to perform analytics on real-time sensor data.

SUMMARY

To address the above issues, according to one aspect of the present disclosure, a computing system is provided herein. In this aspect, the computing system includes a database server that receives data including a plurality of elements each including a sensor identifier and time element, each time element including a timestamp or time period. The database server creates a time series of the data indexed by the sensor identifiers into buckets spaced at even time intervals. The database server receives a query including at least one of the sensor identifiers and at least one query time element. The database server locates target data in the buckets by the at least one of the sensor identifiers and the at least one query time element, and outputs the target data.

Another aspect of the present disclosure relates to a method for database management. In this aspect, the method includes receiving data at a database server, the data including a plurality of elements each including a sensor identifier and time element, each time element including a timestamp or time period. The method further includes creating a time series of the data indexed by the sensor identifiers into buckets spaced at even time intervals. The method further includes receiving a query including at least one of the sensor identifiers and at least one query time element. The method further includes locating target data in the buckets by the at least one of the sensor identifiers and the at least one query time element, and outputting the target data.

Still another aspect of the present disclosure relates to a computing system including a database server including massively parallel processing (MPP) architecture. In this aspect, the database server is configured to receive data that includes radio-frequency identification (RFID) sensor data that indicates locations of tagged items over time, the data including a plurality of elements each including a sensor identifier and time element, each time element including a timestamp or time period. The database server is configured to create a time series of the data indexed by the sensor identifiers into buckets spaced at even time intervals, and receive a query including at least one of the sensor identifiers and at least one query time element. The database server is configured to locate target data in the buckets by the at least one of the sensor identifiers and the at least one query time element. The computing system includes a computing device configured to receive the target data from the database server, and determine assembly status of the tagged items based on the target data.

Yet another aspect of the present disclosure relates to a computing system including a database server. In this aspect, the database server is configured to receive flight test data from a variety of sensors taken in an aircraft over time during a flight test, the flight test data including a plurality of elements each including a sensor identifier and time element, each time element including a timestamp or time period. The database server is configured to create a time series of the data indexed by the sensor identifiers into buckets spaced at even time intervals. The database server is configured to receive a query including at least one of the sensor identifiers and at least one query time element. The database server is configured to locate target data in the buckets by the at least one of the sensor identifiers and the at least one query time element, and output the target data.

The features, functions, and advantages that have been discussed can be achieved independently in various embodiments or may be combined in yet other embodiments, further details of which can be seen with reference to the following description and drawings.

DETAILED DESCRIPTION

Figure 1:
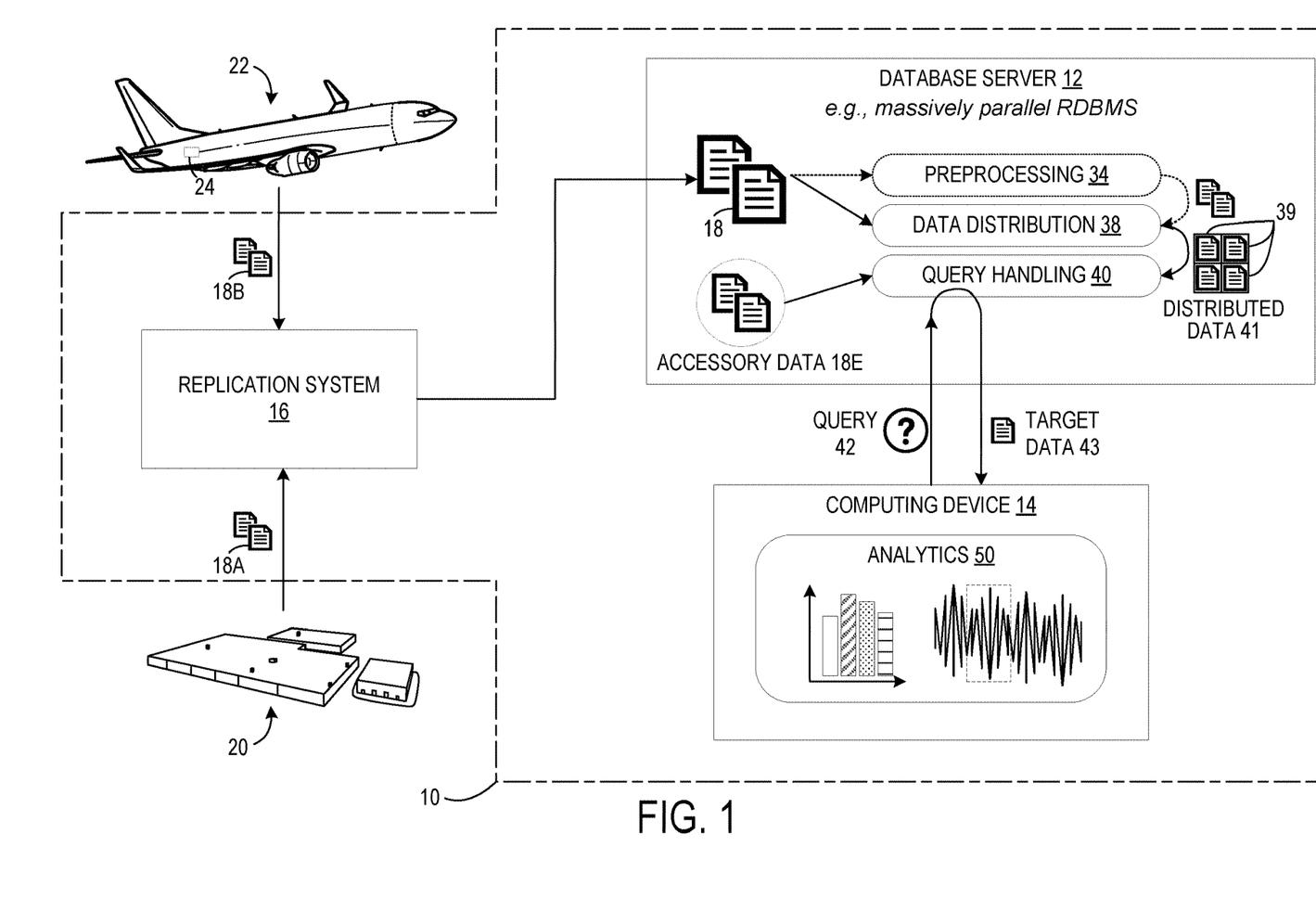
FIG. 1 shows a schematic diagram of an example computing system according to the present disclosure.

FIG. 1 shows a schematic diagram of an example computing system 10 according to the present disclosure. The computing system 10 may include a database server 12, a computing device 14, and a replication system 16. The database server 12 may include massively parallel processing (MPP) architecture, for example. The replication system 16 receives data 18 from a data source. For example, the data source may be a factory 20 that produces sensor data 18A. In another example, the data source may be an aircraft 22 having a flight data recorder (FDR) 24 that produces flight data 18B such as, for example, flight test data (e.g., experimental data) or any data recorded from a flight of the aircraft 22. Each of these examples will be described in more detail below, but it will be appreciated that numerous other data sources may be used. The replication system 16, such as ORACLE GOLDENGATE™, streams the data 18 to the database server 12. Other replication systems, or other methods of streaming data, may also be used.

Figure 2:
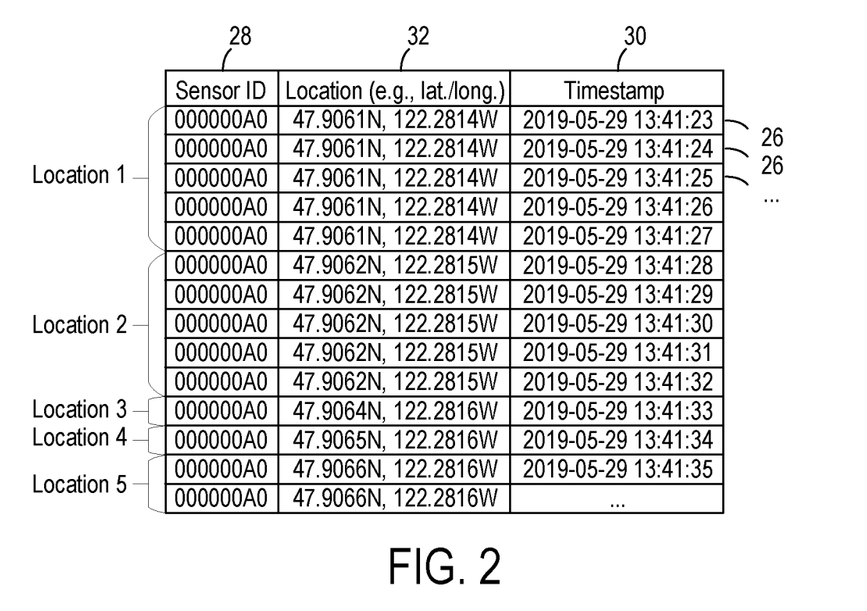
FIG. 2 shows a table of data stored in the computing system of FIG. 1.

FIG. 2 shows a table of data 18 stored in the computing system 10 of FIG. 1. The computing system 10 may store other data in addition to the data 18. As shown, the database server 12 (shown in FIG. 1) is configured to receive the data 18 including a plurality of elements 26 each including a sensor identifier 28 and time element 30, each time element including a timestamp or time period. In the depicted example, the data 18 may be sensor data that indicates locations 32 of tagged items over time. In FIG. 2, the time element 30 is a single timestamp when the sensor measurement was taken. Further, the location 32 is represented as latitude and longitude, but other location identification methods may be used instead. In the depicted example, the data 18 may be radio-frequency identification (RFID) data. However, any type of sensor data may be used as the data 18. In the example of FIG. 2, the sensor, identified by the ID 000000A0, takes measurements at five locations over the span of one day: 47.9061N, 122.2814 W; 47.9062N, 122.2815 W; 47.9064N, 122.2816 W; 47.9065N, 122.2816 W; and 47.9066N, 122.2816 W. In this example, at 13:41:23, the sensor is at a first location (shown as Location 1), takes five measurements, and then moves at 13:41:28 to a second location (shown as Location 2). The sensor reports movement three more times before remaining at rest at the fifth location (shown as Location 5) for the remainder of the day.

Figure 3:
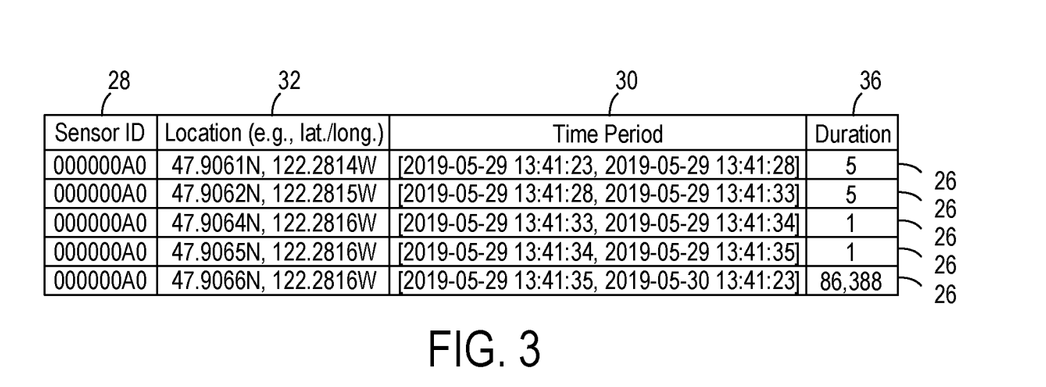
FIG. 3 shows a chart of the data of FIG. 2 after temporal normalization preprocessing.

In FIG. 2, much of the data 18 in the table is redundant. While the entire table is not shown and instead an ellipsis is used to indicate that the data elements 26 continue down the table, there are 86,400 rows in the table. Several of the rows may have a new timestamp and the same sensor identifier 28 and location. However, if the data 18 is of interest for tracking moving parts over time, such as in the example of the factory 20, then each individual element 26 where the location 32 has not changed may not be worth the cost of storing and searching through on the database server 12. Accordingly, the database server 12 may be further configured to optionally preprocess 34 the data 18 with temporal normalization in which consecutive data with redundant locations 32 are collapsed, the result of which is illustrated in FIG. 3. Database normalization in general is the process of organizing data to reduce redundancy and ensure integrity. Temporal normalization, as used herein, refers to the process of consolidating data including a common reading taken at different times, into an ensemble having the common reading and a time period encompassing the different times of the original data. After normalization, the ensemble may have one element in the table that represents the consolidated data. As such, temporally normalized location data represents data in which consecutive data with redundant locations are collapsed.

FIG. 3 shows a chart of the data 18 of FIG. 2 after temporal normalization preprocessing based on location, according to one example normalization method. After temporal normalization, the table is reduced to five rows. Instead of a timestamp, the time element 30 is a time period, and a duration column 36 is added. In this example, any gaps in sensor readings would be detected and lead to an additional row starting at the next detected timestamp, and the prior row time period would end according to the typical detection or ping frequency of the sensor.

Figure 4:
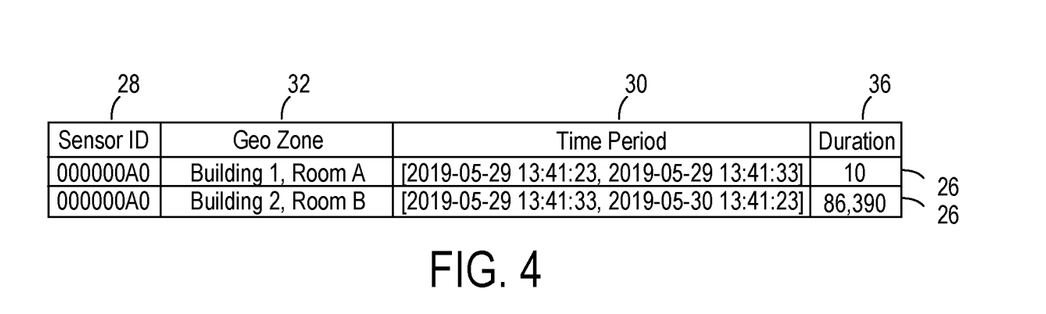
FIG. 4 shows a chart of the data of FIG. 2 after temporal normalization preprocessing based on geospatial zones.

Alternatively, FIG. 4 shows a chart of the data 18 of FIG. 2 after temporal normalization preprocessing based on geospatial zones. That is, the temporal normalization may be performed on geospatial zones each including a range of locations. Here, the location is reported as a zone, such as a building and/or room, which may include multiple coordinates. In some cases, the sensors may be configured to report the zone directly. As with the table in FIG. 3, the time element 30 is a time period, and here, the 86,400 rows have been collapsed to only two rows, saving processing power and storage space while still providing sufficient location accuracy. In some cases, the disclosed preprocessing may instead be performed in post processing on the fly during an analytics query.

Returning to FIG. 1, whether the data 18 has been preprocessed 34 (shown in dotted lines) or not, the data 18 is distributed 38 across the database server 12. One way to distribute the data is to create a table distributed across a dummy ID and add an additional physical index based on the sensor ID, using the following example code (1).

```
CREATE MULTISET TABLE NEWTABLE (
    ID BIGINT NOT NULL,
    CONVERTEDLOCATIONSET BYTEINT,
    CONVERTED LOCATIONX FLOAT,
    CONVERTED LOCATIONY FLOAT,
    CONVERTED LOCATIONZ FLOAT,
    SENSORID VARCHAR(255) CHARACTER SET LATIN
CASESPECIFIC,
    . . . 31 more columns
)
PRIMARY INDEX (ID)
INDEXNEWTABLE_SENSORID_NUSI (SENSORID); . . . (1)
```

While the dummy ID forces the data into an even distribution, when the data 18 is time sensitive, such as when real-time sensor readings are being streamed to the database server 12, decreased latency may be desired. Scanning across a wide range of time, even on a parallel cluster, may result in reduced performance for time sensitive data. Accordingly, the database server 12 may be configured to distribute the data 18 by creating a time series of the data 18 indexed by the sensor identifiers into buckets 39 spaced at even time intervals. Here, the buckets 39 are collections of data in a specified interval. By distributing into the time buckets 39, the data 18 may be made substantially evenly distributed, which allows the sensor identifier to be added to the distribution. The time series may be created by using the following example code (2).

```
CREATE MULTISET TABLE NEWTSTABLE (
    ID BIGINT NOT NULL,
    CONVERTEDLOCATIONSET BYTEINT,
    CONVERTED LOCATIONX FLOAT,
    CONVERTED LOCATIONY FLOAT,
    CONVERTED LOCATIONZ FLOAT,
    SENSORID VARCHAR(255) CHARACTER SET LATIN
    CASESPECIFIC,
    . . . 31 more columns
)
PRIMARY TIME INDEX (TIMESTAMP(6), DATE '2019-05-29',
```

```
MINUTES(60),
   COLUMNS(SENSORID), NONSEQUENCED); ... (2)
```

In example code (2), the dummy ID is eliminated and the sensor ID 28 is now used as a basis for distribution, eliminating the need for a less effective additional physical index based solely on the sensor ID 28. In addition, the time buckets 39 are introduced, here, 60 minutes. That is, the data 18 is distributed into time buckets spaced 60 minutes apart, for each sensor ID 28. In one example, using example code (1) produced a table with a skew factor of zero, due to the dummy ID, and a row count of 3,865,168,700. Here, a skew factor is a measurement of distribution evenness. Using the same data 18, example code (2) produced a table with a skew factor of about 5%, which represents substantially distributed data, and a row count of 162,027,816. Generally, the time series may have a skew factor of 10% or less and be considered reasonably distributed, and the above example of 5% is even better distributed. As example code (2) produced a table with ¼ the number of rows as with example code (1), storage and processing resources may be conserved by using example code (2).

Once the data distribution 38 is performed, the database server 12 may perform query handling 40 using the distributed data 41. The database server 12 may be configured to receive a query 42 including at least one of the sensor identifiers 28 and at least one query time element. To make use of the time buckets 39 set by example code (2), example code (3) below may be used.

```
SELECTsensorId, convertedLocationX, convertedLocationY, lastupdatetime
FROMSOURCE.NEWTSTABLE
WHERE SENSORID in ('000000A0', '000000A1', '000000A2', '000000A3',
'000000A4')
   ANDTIMECODE >= cast('2019-05-29 13:41:23' as timestamp)
   ANDTIMECODE <= cast('2019-05-29 13:41:23' as timestamp) + INTERVAL
'60' MINUTE
   ORDER BY 4 DESC, ... (3)
```

Using such a query 42, the database server 12 may be configured to locate target data 43 in the buckets 39 by the at least one of the sensor identifiers 28 and the at least one query time element (e.g., the timestamp '2019-05-29 13:41:23' in the above example). The timestamp or time period in the query time element may be mapped by the database server 12 to a corresponding time bucket 39 (or time buckets 39), here, a 1 PM to 2 PM time bucket encompassing the timestamp. In this manner, the MPP architecture may be leveraged by directly matching requests only to the units of parallelism that correspond to the target data 43 and time bucket 39, thus cutting costs to 1/Nth of the system, with N being typically hundreds or low thousands of units of parallelism.

In example code (3), 60 minutes of readings from five sensors beginning with 000000A0 are located. For larger queries 42 such as 8 hours of readings from 500 sensors, a query 42 such as example code (4) below, which utilizes a lookup table to obtain individual sensor values that qualify the query 42 without accessing the base data, may be used.

```
SELECTsensorId, count(*). min(lastupdatetime). max (lastupdatetime)
FROMSOURCE.NEWTSTABLE
WHERESENSORID IN
   (SELECT SENSORID FROM SOURCE.NEWTSTABLE WHERE
ANALYTICS_TEAM = '123AB')
   ANDTIME ELEMENT >= cast('2019-05-29 13:41:23' as timestamp)
   AND TIME ELEMENT <= cast('2019-05-29 13:41:23' as timestamp) +
INTERVAL '8' HOUR
   ORDER BY 1 ORDER BY 1; ... (4)
```

In response to the query, the database server 12 may be configured to output the target data 18D, for example, to the computing device 14. Using example codes (2) and either (3) or (4) above, in one example, querying the database server 12 for 1, 5, 10, 20, or 500 tags, for 5 minutes, 15 minutes, 60 minutes, 8 hours, or one month reduced processing resources used by 92.9% compared to using example code (1). Further, queries were handled in an average of 0.43 seconds, and thus a response to the query 42 may be returned in real-time. Real-time, as used herein, means that all retrieval and subsequent processing is sufficiently fast to typically support interactive use or the effective time that someone could wait for a result, which is typically up to a few seconds. By distributing the data 18 across both the sensor identifier and the time buckets 39, the time series may be combined with temporal normalization without introducing unreasonable latency.

Figure 5:
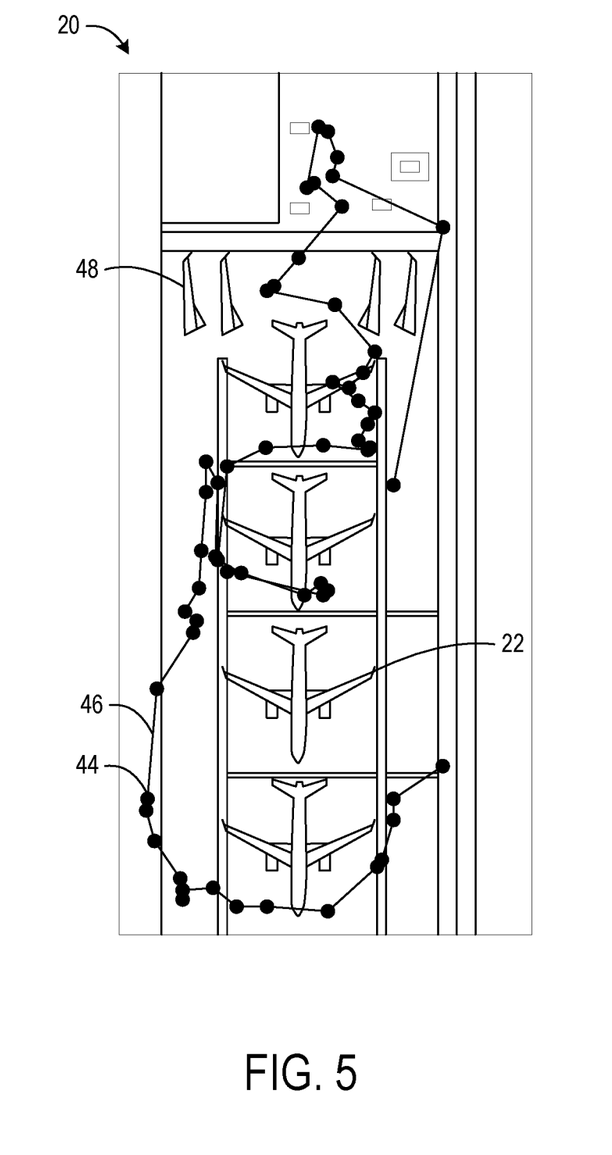
FIG. 5 shows a schematic plan view of an example factory tracked by the computing system of FIG. 1.

FIG. 5 shows a schematic plan view of an example factory 20 tracked by the computing system 10 of FIG. 1. As discussed above, the data 18 may be RFID sensor data that indicates locations of tagged items over time. Within a factory building, typically active RFID sensors ping a large grid of antennas to provide location information. In some cases, passive RFID tags are scanned by mobile scanners or at set locations. Moving objects may be tracked by active RFID, while passive RFID scans may additionally or alternatively be utilized in the factory 20 and data collected therefrom is by contrast typically not continuous in time. Here, the tagged items may include autonomous vehicles, machine parts for assembly, tools, or supply materials, to provide merely a few examples. Furthermore, FIG. 5 depicts an aircraft factory by way of example, but any environment containing vast numbers of moving parts that warrant sensor tracking may be suitable. As shown in FIG. 5, a sensor 44 is tracked as it is moved around an aircraft 22 along a path 46. While only one sensor 44 is shown for ease of viewing, it will be appreciated that multitudes of sensors 44 may be utilized in a given factory 20. Aircraft parts 48, which may be containers of parts, may be tagged by sensors during assembly, for example. Accordingly, the computing device 14 may be configured to receive the target data 18D from the database server 12, and determine assembly status of the tagged items based on the target data. In this example, the computing device 14 may use one or more algorithms to determine the assembly status of the aircraft 22 based on the path 46 of the sensor 44. Accordingly, analytics 50 run by the computing device 14 may provide visualization tools to show asset utilization and availability, alerts at critical timings, and assistance in efficiently harmonizing all of the moving parts in the factory 20 for edge deployment, etc. The computing device 14 may further utilize accessory data 18E, either when querying the database server 12 or when performing the analytics 50 post-query. The accessory data 18E may be data other than sensor data, for example, shop floor data or bills of material.

In another example, the data 18 may be flight test data 18B from a variety of sensors, taken in an aircraft 22 over time during a flight test. The data may also be taken in the aircraft 22 during regular service rather than a flight test, if desired. In this example, the flight test data 18B may be collected in the FDR 24, which receives data from hundreds to thousands of sensors to record aircraft performance parameters. For example, the flight test data 18B may include attitude, 6 degrees of freedom (DoF) acceleration, atmospheric pressure and temperature, local atmospheric presser and temperature of various components, throttle and other control instrument position, etc. In one example, one flight may produce 60 million rows (15 GB) of text, and a whole fleet may produce trillions of rows. In view of this, time-alignment of the data is critical, and the massive amounts of data may take considerable resources to store and process. Using the time series techniques discussed above may substantially improve efficiency when storing and querying the database server 12, particularly in comparison to bulk processing flight data from one or more flights for all sensors after completion of the flights. Instead, selected readings of interest may be triggered to be sent during flight and processed in real-time.

Figure 6A:
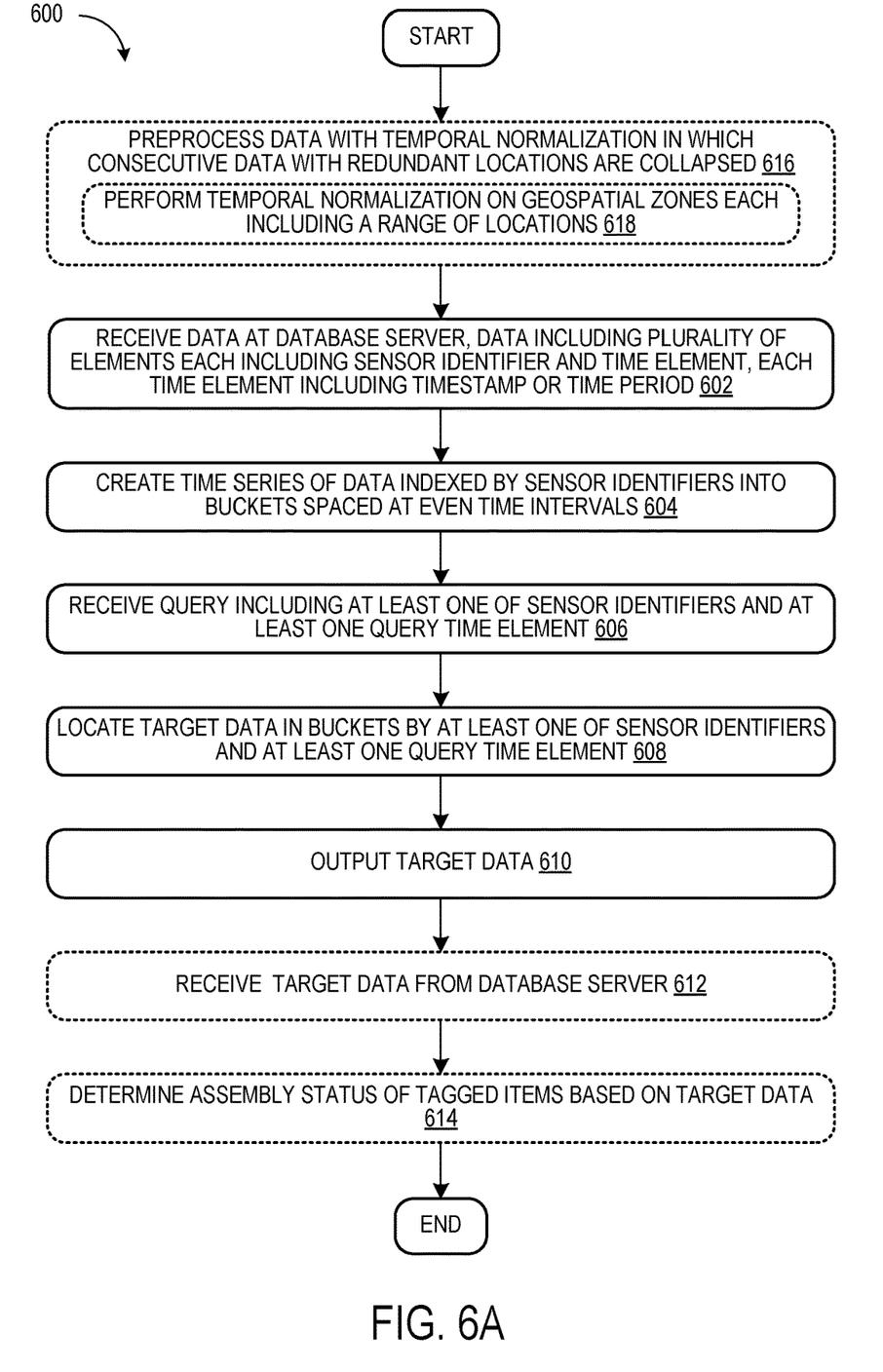
FIG. 6A shows an example flowchart of a method for database management according to the present disclosure.
Figure 6B:
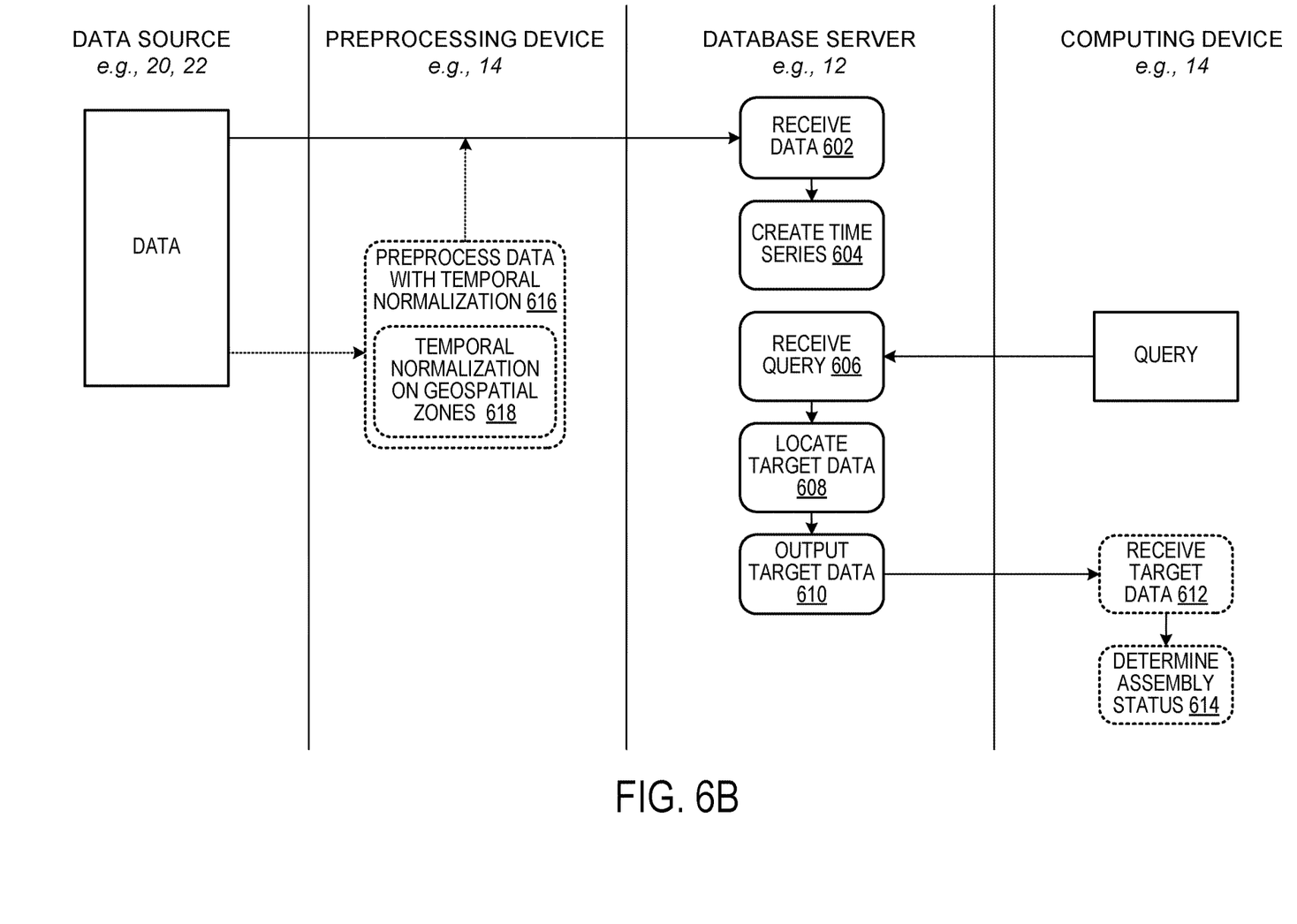
FIG. 6B shows a corresponding swimlane diagram.

FIG. 6A shows a flowchart of a method 600 for database management, and FIG. 6B shows a corresponding swimlane diagram. The following description of method 600 is provided with reference to the computing system 10 described above and shown in FIG. 1. It will be appreciated that method 600 may also be performed in other contexts using other suitable components.

With reference to FIGS. 6A and 6B, at 602, the method 600 may include receiving data at a database server, the data including a plurality of elements each including a sensor identifier and time element, each time element including a timestamp or time period. One example of the plurality of elements is illustrated in FIG. 2. As discussed above, the database server may include massively parallel processing (MPP) architecture. In one example, the data may be radio-frequency identification (RFID) sensor data that indicates locations of tagged items over time. Further, the tagged items may include autonomous vehicles, machine parts for assembly, tools, or supply materials.

At 604, the method 600 may include creating a time series of the data indexed by the sensor identifiers into buckets spaced at even time intervals. As discussed above, the time series may be created by code such as example code (2). The time series may have a skew factor of 10% or less, and thus may be substantially distributed across the database server. At 606, the method 600 may include receiving a query including at least one of the sensor identifiers and at least one query time element. Two examples of the query are example codes (3) and (4). At 608, the method 600 may include locating target data in the buckets by the at least one of the sensor identifiers and the at least one query time element.

At 610, the method 600 may include outputting the target data. A response to the query may be returned in real-time, after which a computing device may be configured to perform various analytics with the target data. For example, at 612, the method 600 may include receiving the target data from the database server. At 614, the method 600 may include determining assembly status of the tagged items based on the target data. Similarly, more complex queries may utilize the output target data in a next step for further analysis.

Optionally, at 616, the method 600 may include preprocessing the data with temporal normalization in which consecutive data with redundant locations are collapsed. Further, at 618, the temporal normalization may be performed on geospatial zones each including a range of locations. The preprocessing steps may be performed by the server 12, by the computing device 14 or another computing device 14, or the replication system 16, for example. In FIG. 6B, steps 616 and 618 are illustrated as being performed by a preprocessing device, using the computing device 14 as an example of such a preprocessing device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
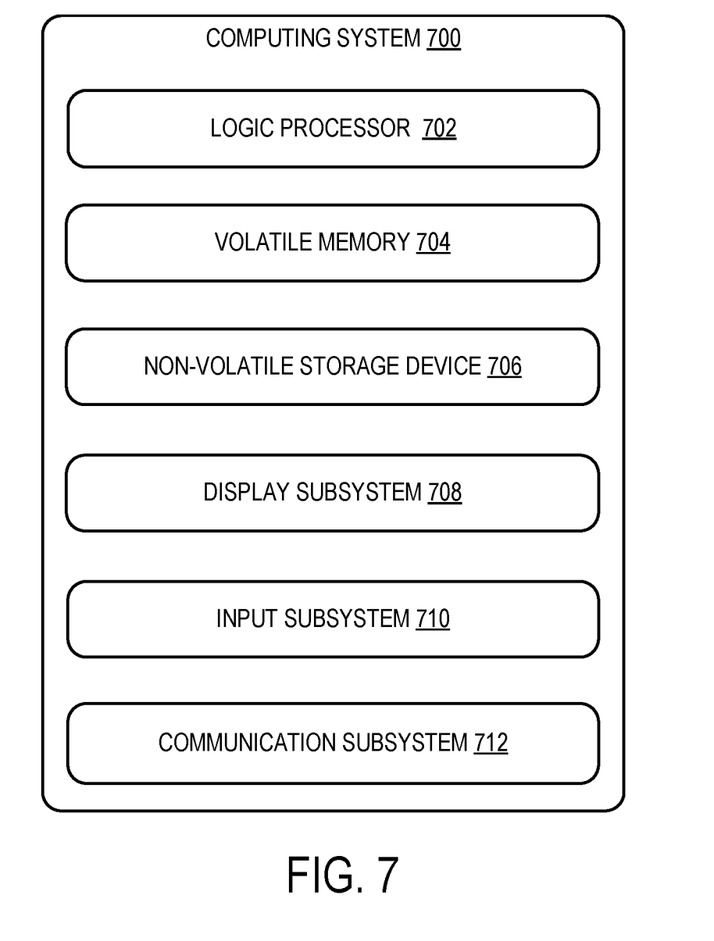
FIG. 7 shows a schematic view of an example computing environment in which the computing system of FIG. 1 may be enacted.

FIG. 7 schematically shows a non-limiting embodiment of a computing system 700 that can enact one or more of the methods and processes described above. Computing system 700 is shown in simplified form. Computing system 700 may embody the computing system 10 described above and illustrated in FIG. 1. Computing system 700 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "process" may be used to describe an aspect of computing system 700 typically implemented in software by one or more processors to perform a particular function using portions of volatile memory, which function involves transformative processing that specially configures the processor to perform the function. Thus, a process may be instantiated via logic processor 702 executing instructions held by non-volatile storage device 706, using portions of volatile memory 704. It will be understood that different processes may be instantiated from the same application, service, code block, object, library, routine, API, function, etc. Likewise, the same processes may be instantiated by different applications, services, code blocks, objects, routines, APIs, functions, etc. The term "process" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a database server including massively parallel processing (MPP) architecture, configured to:
receive data that includes radio-frequency identification (RFID) sensor data that indicates locations of tagged items over time, the tagged items including aircraft parts for assembly, the data including a plurality of elements each including a sensor identifier and time element, each time element including a timestamp or time period;
create a time series of the data indexed by the sensor identifiers into buckets spaced at even time intervals;
preprocess the data with temporal normalization in which consecutive data with redundant sensor readings are collapsed;
receive a query including at least one of the sensor identifiers and at least one query time element; and
locate target data in the buckets by the at least one of the sensor identifiers and the at least one query time element; and a computing device configured to:
    receive the target data from the database server; and
    determine assembly status of an aircraft based on the target data and accessory data including a bill of materials for the aircraft.

2. The computing system of claim 1, wherein the temporal normalization is performed on geospatial zones each including a range of locations.

3. The computing system of claim 1, wherein the tagged items include autonomous vehicles.

4. The computing system of claim 1, wherein a response to the query is returned in real-time.

5. The computing system of claim 1, wherein the time series has a skew factor of 10% or less.

6. The computing system of claim 1, wherein the tagged items include tools.

7. The computing system of claim 1, wherein the tagged items include supply materials.

8. A method for database management, comprising:
    receiving data that includes radio-frequency identification (RFID) sensor data that indicates locations of tagged items over time at a database server including massively parallel processing (MPP) architecture, the tagged items including aircraft parts for assembly, the data including a plurality of elements each including a sensor identifier and time element, each time element including a timestamp or time period;
    creating a time series of the data indexed by the sensor identifiers into buckets spaced at even time intervals;
    preprocessing the data with temporal normalization in which consecutive data with redundant sensor readings are collapsed;
    receiving a query including at least one of the sensor identifiers and at least one query time element;
    locating target data in the buckets by the at least one sensor identifier and the at least one query time element;
    receiving the target data from the database server at a computing device; and
    determining assembly status of an aircraft based on the target data and accessory data including a bill of materials for the aircraft.

9. The method of claim 8, wherein the temporal normalization is performed on geospatial zones each including a range of locations.

10. The method of claim 8, wherein the tagged items include autonomous vehicles.

11. The method of claim 8, wherein a response to the query is returned in real-time.

12. The method of claim 8, wherein the time series has a skew factor of 10% or less.

13. The method of claim 8, wherein the tagged items include tools.

14. The method of claim 8, wherein the tagged items include supply materials.

15. The method of claim 8, wherein the location of the tagged items is indicated by at least one of RFID sensors pinging a grid of antennas, or RFID tags being scanned by scanners at set locations.

16. A computing system, comprising:
    a database server including massively parallel processing (MPP) architecture, the database server configured to:
        receive data that includes radio-frequency identification (RFID) sensor data that indicates locations of tagged items over time, the tagged items including aircraft parts for assembly, the data including a plurality of elements each including a sensor identifier and time element, each time element including a timestamp or time period;
        create a time series of the data indexed by the sensor identifiers into buckets spaced at even time intervals;
        preprocess the data with temporal normalization in which consecutive data with redundant sensor readings are collapsed;
        receive a query including at least one of the sensor identifiers and at least one query time element; and
        locate target data in the buckets by the at least one of the sensor identifiers and the at least one query time element; and
    a computing device configured to:
        receive the target data from the database server;
        determine assembly status of an aircraft based on the target data and accessory data including a bill of materials for the aircraft; and
        determine and display availability of the aircraft parts for assembly in the aircraft.

17. The computing system of claim 16, wherein the temporal normalization is performed on geospatial zones each including a range of locations.

18. The computing system of claim 16, wherein a response to the query is returned in real-time.

19. The computing system of claim 16, wherein the tagged items include tools.

20. The computing system of claim 16, wherein the tagged items include supply materials.

* * * * *